US012633696B2

(12) United States Patent
Kagami

(10) Patent No.: US 12,633,696 B2
(45) Date of Patent: May 19, 2026

(54) ELECTRIC CONNECTOR WITH TERMINAL HELD BY HOUSING

(71) Applicant: HIROSE ELECTRIC CO., LTD., Kanagawa (JP)

(72) Inventor: Ryuhei Kagami, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 288 days.

(21) Appl. No.: 18/459,617

(22) Filed: Sep. 1, 2023

(65) Prior Publication Data

US 2024/0088596 A1 Mar. 14, 2024

(30) Foreign Application Priority Data

Sep. 5, 2022 (JP) ................................ 2022-140575

(51) Int. Cl.

| | |
|---|---|
| ***H01R 13/42*** | (2006.01) |
| ***H01R 12/71*** | (2011.01) |
| ***H01R 13/11*** | (2006.01) |

(52) U.S. Cl.

CPC ........... *H01R 13/42* (2013.01); *H01R 12/716* (2013.01); *H01R 13/112* (2013.01)

(58) Field of Classification Search

CPC .............................. H01R 13/42; H01R 13/112

USPC ....................................................... 439/733.1

See application file for complete search history.

(56) References Cited

U.S. PATENT DOCUMENTS

| | | | | |
|---|---|---|---|---|
| 5,145,386 | A | 9/1992 | Berg et al. | |
| 5,188,535 | A * | 2/1993 | Bertho ................ | H01R 12/716 439/82 |
| 5,788,539 | A | 8/1998 | Fedder | |
| 2002/0049000 | A1* | 4/2002 | Tanaka .............. | H01R 12/7088 439/660 |

(Continued)

FOREIGN PATENT DOCUMENTS

| | | | |
|---|---|---|---|
| JP | 5-217641 | A | 8/1993 |
| JP | 2002134196 | A | 5/2002 |

(Continued)

OTHER PUBLICATIONS

Japanese Office Action (JPOA) mailed on Jan. 22, 2026 and issued for Japanese Patent Application No. 2022-140575 and its English machine translation.

*Primary Examiner* — Tulsidas C Patel
*Assistant Examiner* — Thaslimur Rahman
(74) *Attorney, Agent, or Firm* — RANKIN, HILL & CLARK LLP

(57) ABSTRACT

Provided is an electric connector including: a terminal; and a housing holding the terminal. The terminal has a mounting portion and a pair of arm portions. The pair of arm portions is coupled to the mounting portion, extends in a lateral direction of the electric connector from the mounting portion, and is configured such that a terminal of a partner connector is inserted into between one and other arm portions of the pair of arm portions. Each of the one arm portion and the other arm portion has a holding target portion and a contact piece, the holding target portion is held on the housing, and the contact piece is coupled to the holding target portion and is configured to contact the terminal of the partner connector. A plate thickness direction of the pair of arm portions is substantially perpendicular to a plate thickness direction of the mounting portion.

16 Claims, 9 Drawing Sheets

(56) References Cited

U.S. PATENT DOCUMENTS

| | | | | |
|---|---|---|---|---|
| 2012/0052711 | A1* | 3/2012 | Hasegawa ............ | H01R 13/112<br>439/345 |
| 2012/0214353 | A1 | 8/2012 | Midorikawa | |
| 2013/0316563 | A1* | 11/2013 | Brandberg ........... | H01R 4/4823<br>439/350 |

FOREIGN PATENT DOCUMENTS

| | | | |
|---|---|---|---|
| JP | 2012-49013 | A | 3/2012 |
| JP | 2012169235 | A | 9/2012 |

* cited by examiner

ELECTRIC CONNECTOR WITH TERMINAL HELD BY HOUSING

CROSS-REFERENCE TO RELATED APPLICATION

This application claims priority from Japanese Patent Application No. 2022-140575 filed with the Japan Patent Office on Sep. 5, 2022, the entire content of which is hereby incorporated by reference.

BACKGROUND

1. Technical Field

The present disclosure relates to an electric connector.

2. Related Art

Typically, various techniques on an electric connector having a terminal and a housing for connection to, e.g., a printed circuit board or a flexible flat cable have been known. For example, JP-A-2012-49013 discloses an electric connector having terminals and housings. The terminal has a contact portion, and on both sides of a groove of the contact portion, has contact pieces formed in a fork shape. A terminal of a partner connector is received in the groove, and accordingly, the contact pieces and the terminal of the partner connector contact each other. The housing includes a restriction portion that restricts displacement of the contact pieces by contacting edge portions of the contact pieces upon removal of the partner connector. In this electric connector, the housing is provided on one side (upper side) of the contact pieces in the direction of fitting to the partner connector in order to reduce displacement of the contact pieces in one direction (upper direction) in the fitting direction. In addition, the housing is also provided on the other side (lower side) of the contact pieces in the fitting direction, and the contact pieces are supported by the housing. In addition, JP-A-5-217641 discloses an electric connector having a configuration similar to that of JP-A-2012-49013, for example.

SUMMARY

An electric connector according to an embodiment of the present disclosure includes: a terminal; and a housing holding the terminal. The terminal has a mounting portion and a pair of arm portions. The pair of arm portions is coupled to the mounting portion, extends in a lateral direction of the electric connector from the mounting portion, and is configured such that a terminal of a partner connector is inserted into between one and other arm portions of the pair of arm portions. Each of the one arm portion and the other arm portion of the pair of arm portions has a holding target portion and a contact piece, the holding target portion is held on the housing, and the contact piece is coupled to the holding target portion and is configured to contact the terminal of the partner connector. The mounting portion and the pair of arm portions are formed of a plate-shaped member, and a plate thickness direction of the pair of arm portions is substantially perpendicular to a plate thickness direction of the mounting portion.

DETAILED DESCRIPTION

Figure 1:
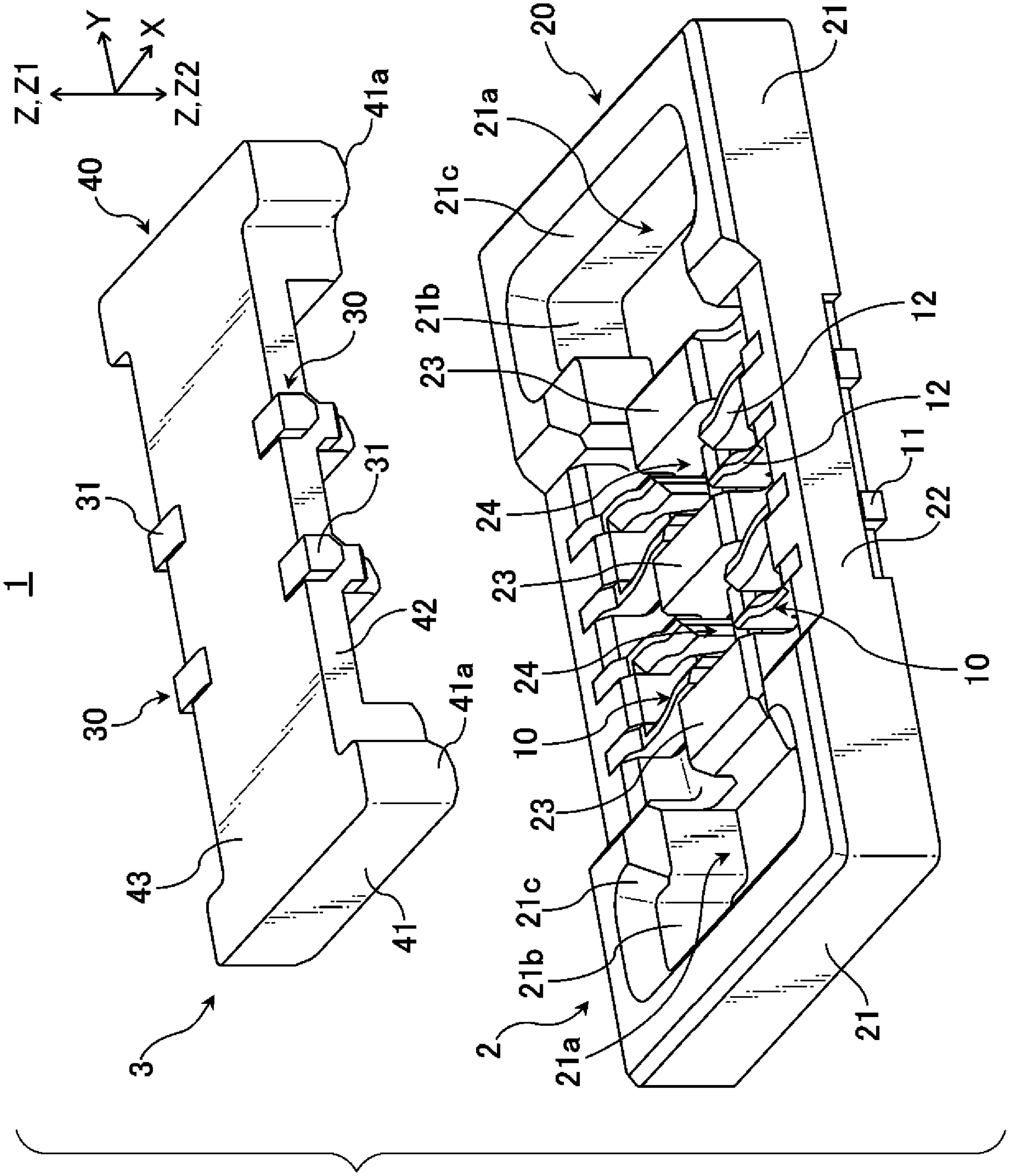
FIG. 1 is a perspective view of a connector assembly according to an embodiment of the present disclosure from a plug connector side.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In recent years, due to, e.g., size reduction and function enhancement in electronic devices such as smartphones and mobile phones, the density of electronic components mounted on a printed circuit board has been increased, and accordingly, there has also been a demand for, e.g., thickness reduction (height reduction) in an electric connector itself. In the electric connectors as described in JP-A-2012-49013 and JP-A-5-217641, the housing is provided on one and the other sides (upper and lower sides) of the contact pieces of the terminal in the fitting direction, i.e., the contact pieces are sandwiched by the housing in the fitting direction. For this reason, these electric connectors have a housing-terminal-housing three-layer structure, and tend to have a long length in the fitting direction. Thus, it is difficult to reduce the electric connectors in thickness.

As one of reasons for employing the three-layer structure for the electric connector as described above, the terminal is configured such that the plate thickness direction of the contact piece is along the fitting direction, i.e., the plate surface of the contact piece extends perpendicularly to the fitting direction. In the case of such a configuration of the terminal, the length of the contact piece in the fitting direction is short, and for this reason, buckling may be caused due to great displacement of the contact piece upon insertion or removal of the terminal of the partner connector. Thus, in order to reduce such buckling of the contact piece of the terminal, the housing holds the contact pieces in the fitting direction to restrict displacement of the contact pieces in the fitting direction. Note that typically, the electric connector with such a three-layer structure tends to be formed by press-fitting the terminal into the housing.

The present disclosure has been made to solve the above-described problems, and is intended to omit a housing for holding contact pieces from an electric connector having terminals contacting terminals of a partner connector through the contact pieces to properly satisfy a demand for thickness reduction.

An electric connector according to one embodiment of the present disclosure includes: a terminal; and a housing holding the terminal. The terminal has a mounting portion and a pair of arm portions. The pair of arm portions is coupled to the mounting portion, extends in a lateral direction of the electric connector from the mounting portion, and is configured such that a terminal of a partner connector is inserted into between one and other arm portions of the pair of arm portions. Each of the one arm portion and the other arm portion of the pair of arm portions has a holding target portion and a contact piece, the holding target portion is held on the housing, and the contact piece is coupled to the holding target portion and is configured to contact the terminal of the partner connector. The mounting portion and the pair of arm portions are formed of a plate-shaped member, and a plate thickness direction of the pair of arm portions is substantially perpendicular to a plate thickness direction of the mounting portion.

According to the present disclosure, the housing for holding the contact pieces is omitted from the electric connector having the terminals contacting the terminals of the partner connector through the contact pieces so that the demand for thickness reduction can be properly satisfied.

Hereinafter, one embodiment of the present disclosure will be described with reference to the drawings. Note that in all figures for describing the embodiment, the same reference numerals are used to represent the same members in principle and repeated description thereof will be omitted. Moreover, each embodiment (also including modifications) will be independently described, but the present disclosure is applicable to electric connectors formed by combination of components of the embodiments.

[Configuration of Connector Assembly]

First, the configuration of a connector assembly according to the present embodiment will be described with reference to FIGS. 1 and 2. FIG. 1 is a perspective view of the connector assembly according to the present embodiment from a plug connector side, and FIG. 2 is a perspective view of the connector assembly according to the present embodiment from a receptacle connector side (side opposite to that of FIG. 1).

Figure 2:
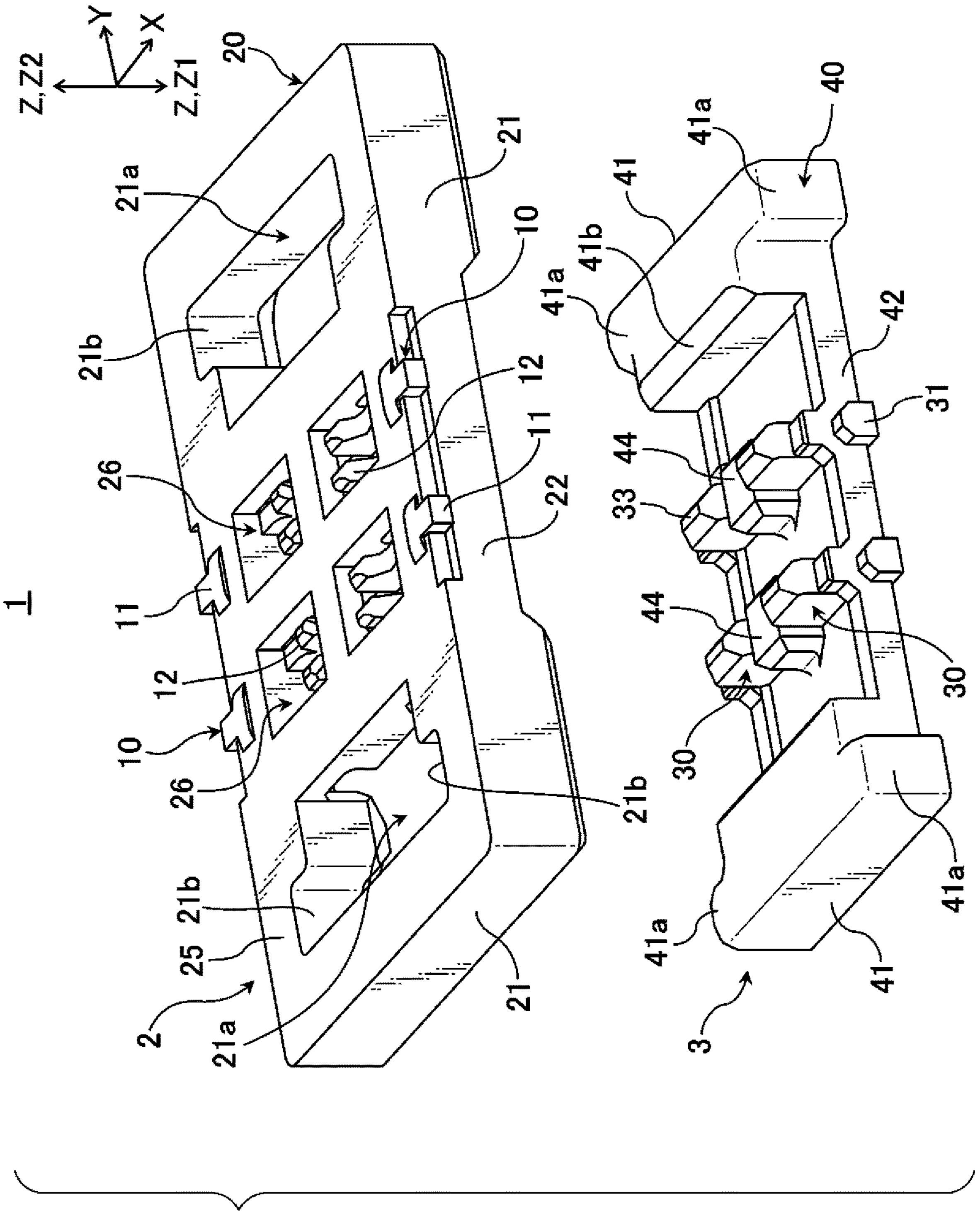
FIG. 2 is a perspective view of the connector assembly according to the embodiment of the present disclosure from a receptacle connector side.

As shown in FIGS. 1 and 2, the connector assembly 1 according to the present embodiment has a receptacle connector 2 and a plug connector 3, and the receptacle connector 2 and the plug connector 3 are fittable to each other. Hereinafter, in a case where the receptacle connector 2 and the plug connector 3 are not distinguished from each other, these connectors will be referred to as a "connector(s) 2, 3" or merely as a "connector(s)." The connector 2, 3 is mounted on a board, such as a printed circuit board, which is a not-shown predetermined member. Specifically, the receptacle connector 2 and the plug connector 3 are attached, on a bottom wall 25 side (see FIG. 2) and a bottom wall 43 side (see FIG. 1), to the not-shown boards. The connector 2, 3 may be used as an internal component of a small electronic device such as a mobile phone, a smartphone, a digital camera, or a laptop computer. Note that the receptacle connector 2 is one example of an "electric connector" of the present disclosure. The receptacle connector 2 is also mountable, other than the above-described board, on various members (predetermined members) such as a flexible flat cable, but an example where the receptacle connector 2 is mounted on the board will be described below.

In FIGS. 1 and 2 (the same also applies to other figures), the lateral direction (width direction) of the connector will be referred to as "X" (equivalent to a "first direction" in the present disclosure), the longitudinal direction (depth direction) of the connector will be referred to as "Y" (equivalent to a "second direction" in the present disclosure), and the fitting direction (upper-lower direction) of the connector will be referred to as "Z." Of the sides of a certain connector in the fitting direction Z, the side on which the connector receives a partner connector will be defined as "upper" or "front" and the side on which the connector is attached to a board will be defined as "lower" or "back" in the present specification. Of the receptacle connector 2, the direction indicated by "Z1" in the fitting direction Z is specifically equivalent to an "upper direction," and the direction indicated by "Z2" in the fitting direction Z is specifically equivalent to a "lower direction." Of the plug connector 3, the direction indicated by "Z2" in the fitting direction Z is, on the other hand, equivalent to an "upper direction," and the direction indicated by "Z1" in the fitting direction Z is equivalent to a "lower direction."

As shown in FIG. 1, the receptacle connector 2 mainly has terminals 10 and a housing 20 holding the terminals 10. Specifically, the receptacle connector 2 has four terminals 10 arrayed at equal intervals along the lateral direction X and the longitudinal direction Y, and these four terminals 10 are held on the housing 20. For example, the receptacle connector 2 is formed by integral molding using conductive members forming the terminals 10, such as copper alloy, and resin forming the housing 20, such as liquid crystal polymer (LCP). In a typical example, the terminals 10 are insert-molded into the housing 20.

The housing 20 of the receptacle connector 2 has first side walls 21, second side walls 22, three inner walls 23, and two recessed portions 24. The first side walls 21 form outer walls (in other words, peripheral walls) on both sides in the longitudinal direction Y, and form part of outer walls on both sides in the lateral direction X. The second side walls 22 are coupled to the first side walls 21, and form the other part (part other than the first side walls 21) of the outer walls on both sides in the lateral direction X. The three inner walls 23 are provided adjacent to both sides of each terminal 10 in the longitudinal direction Y, and extend in the lateral direction X. Each of the two recessed portions 24 is provided between adjacent ones of these three inner walls 23. The housing 20 further has a bottom wall 25. Mounting portions 11 for connecting the terminals 10 to the board by soldering are exposed on the bottom wall 25 (see FIG. 2). The mounting portions 11 slightly protrude from the bottom wall 25.

More specifically, the first side wall 21 is formed higher than the second side wall 22. The housing 20 is configured such that the second side walls 22 hold one ends of the terminals 10 in the lateral direction X. That is, in the housing 20, only outer wall portions holding the terminals 10 are formed of the second side walls 22, and the other outer wall portions are formed of the first side walls 21. The first side wall 21 has, on the inside thereof, a through-hole 21*a* extending in the fitting direction Z, and the through-holes 21*a* include four recessed portions 21*b* recessed in the lateral direction X. These four recessed portions 21*b* are positioned in the vicinity of four corners of the receptacle connector 2. The first side wall 21 has, at the upper end thereof, an inclined surface 21*c* inclined to the lower direction Z2. Further, the housing 20 also has four through-holes 26 extending in the fitting direction Z and formed so as to house part (contact pieces 14 of arm portions 12 as described later) of each of the four terminals 10 (also see FIG. 2).

Next, the plug connector 3 mainly has terminals 30 and a housing 40 holding the terminals 30, as shown in FIG. 2. Specifically, the plug connector 3 has four terminals 30 arrayed at equal intervals along the lateral direction X and the longitudinal direction Y, and these four terminals 30 are held on the housing 40. For example, the plug connector 3 is formed by integral molding using conductive members forming the terminals 30, such as copper alloy, and resin forming the housing 40, such as liquid crystal polymer (LCP). In a typical example, the terminals 30 are insert-molded into the housing 40.

The housing 40 of the plug connector 3 has first side walls 41, second side walls 42, and holding portions 44. The first side walls 41 form outer walls (in other words, peripheral walls) on both sides in the longitudinal direction Y. The second side walls 42 are coupled to the first side walls 41, form outer walls on both sides in the lateral direction X, and hold one ends of the terminals 30 in the lateral direction X. The holding portions 44 hold the other ends of the terminals 30 in the lateral direction X. The first side wall 41 is formed higher than the second side wall 42. The first side walls 41 are formed with four raised portions 41*a* protruding in the lateral direction X. These four raised portions 41*a* are positioned at four corners of the plug connector 3. Further, the housing 40 has a bottom wall 43, and mounting portions 31 for connecting the terminals 30 to the board by soldering are exposed on the bottom wall 43 (see FIG. 1). The mounting portions 31 slightly protrude from the bottom wall 43.

Here, fitting of the receptacle connector 2 and the plug connector 3, specifically fitting of the housing 20 of the receptacle connector 2 and the housing 40 of the plug connector 3, will be described. First, in a course of fitting the connectors 2, 3 to each other, the first side walls 21 formed higher in the housing 20 of the receptacle connector 2 and the first side walls 41 formed higher in the housing 40 of the plug connector 3 contact each other. At this time, the recessed portions 21*b* formed in the first side walls 21 of the housing 20 of the receptacle connector 2 and the raised portions 41*a* formed at the first side walls 41 of the housing 40 of the plug connector 3 guide alignment of the connectors 2, 3 upon fitting thereof. In addition, the inclined surfaces 21*c* formed at the first side walls 21 of the housing 20 and inclined surfaces 41*b* formed at the first side walls 41 of the housing 40 also guide alignment upon fitting. In addition, inclined surfaces formed at the upper ends of the second side walls 22, inner walls 23, terminals 10, and the like of the housing 20 of the receptacle connector 2 and inclined surfaces formed at the upper ends of the holding portions 44, terminals 30, and the like of the housing 40 of the plug connector 3 also guide alignment upon fitting.

When the connectors 2, 3 are fitted to each other, the entirety of the plug connector 3 is perfectly fitted in the receptacle connector 2. In this case, the first side walls 41 of the housing 40 of the plug connector 3 are housed (fitted) in the through-holes 21*a* formed in the first side walls 21 of the housing 20 of the receptacle connector 2. At this time, the recessed portions 21*b* formed in the first side walls 21 of the housing 20 of the receptacle connector 2 and the raised portions 41*a* formed at the first side walls 41 of the housing 40 of the plug connector 3 engage with each other. Moreover, the holding portions 44 of the housing 40 of the plug connector 3 are housed in the recessed portions 24 each provided between adjacent ones of the inner walls 23 of the housing 20 of the receptacle connector 2.

[Configuration of Plug Connector]

Figure 3:
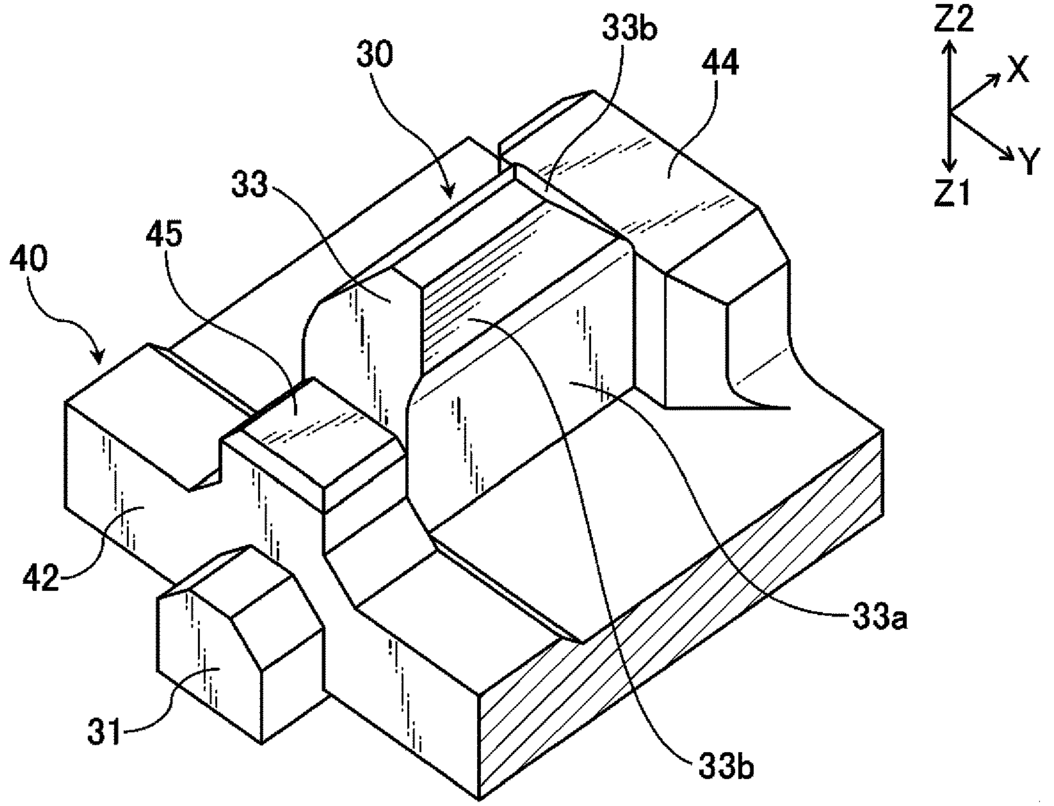
FIG. 3 is a perspective view of part of a plug connector according to the embodiment of the present disclosure.
Figure 4:
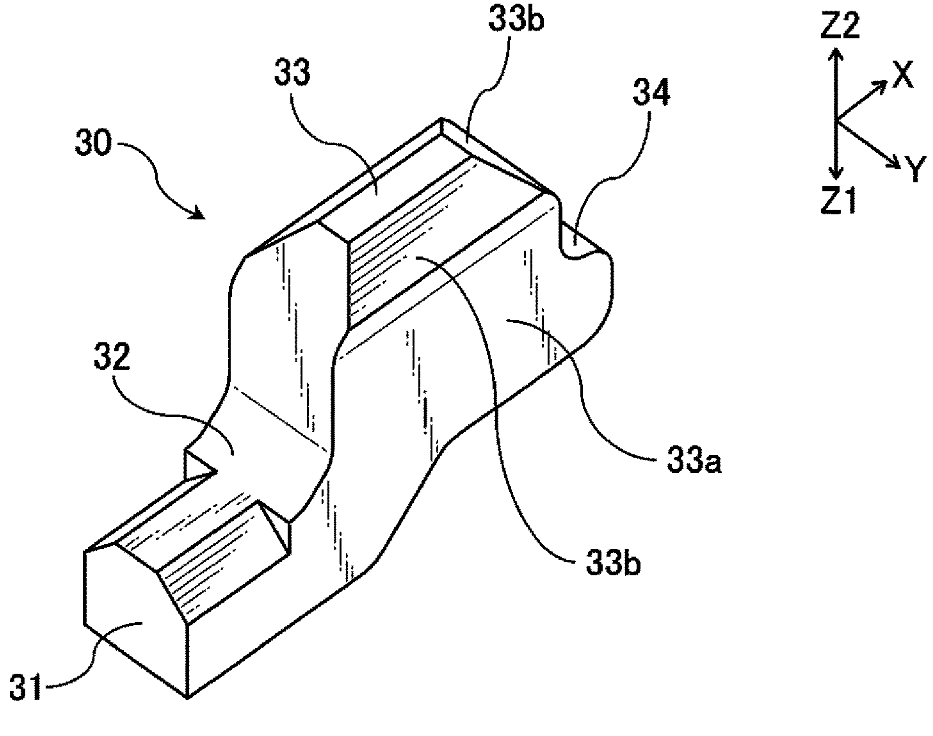
FIG. 4 is a perspective view of one terminal of the plug connector according to the embodiment of the present disclosure.

Next, the plug connector 3 according to the present embodiment will be specifically described with reference to FIGS. 3 and 4. FIG. 3 is a perspective view of part of the plug connector 3 according to the present embodiment, specifically one terminal 30 and part of the housing 40 therearound, diagonally from above. FIG. 4 is a perspective view of only one terminal 30 of the plug connector 3 according to the present embodiment diagonally from above. Note that the configuration of the terminal 30 of the plug connector 3 will be mainly described herein. Moreover, description of contents overlapping with those described above with reference to FIGS. 1 and 2 will be omitted herein as necessary.

As shown in FIG. 3, the housing 40 of the plug connector 3 holds one end of the terminal 30 in the lateral direction X by a holding portion 45 formed at the second side wall 42, and holds the other end of the terminal 30 in the lateral direction X by the holding portion 44. As shown in FIG. 4, the terminal 30 of the plug connector 3 has the mounting portion 31 for connecting the terminal 30 to the board by soldering, a holding target portion 32 coupled to the mounting portion 31 and held by the holding portion 45 of the housing 40, a contact portion 33 coupled to the holding target portion 32 and configured to contact the terminal 10 of the receptacle connector 2, and a holding target portion 34 coupled to the contact portion 33 and held by the holding portion 44 of the housing 40. The mounting portion 31, the holding target portion 32, the contact portion 33, and the holding target portion 34 forming the terminal 30 are formed in this order from the outside to the inside of the housing 40 along the lateral direction X.

In such a terminal 30, only the mounting portion 31 and the contact portion 33 other than the holding target portions 32, 34 held on the housing 40 are exposed (see FIG. 3). More specifically, the side surfaces of the contact portion 33 of the terminal 30 on both sides in the longitudinal direction Y form contact surfaces 33*a* configured to contact the terminal 10 (specifically contact pieces 14 of a pair of arm portions 12 as described later) of the receptacle connector 2. Further, inclined surfaces 33*b* inclined to the lower direction Z1 of the plug connector 3 are formed at the upper end of the contact portion 33.

[Configuration of Receptacle Connector]

Figure 5:
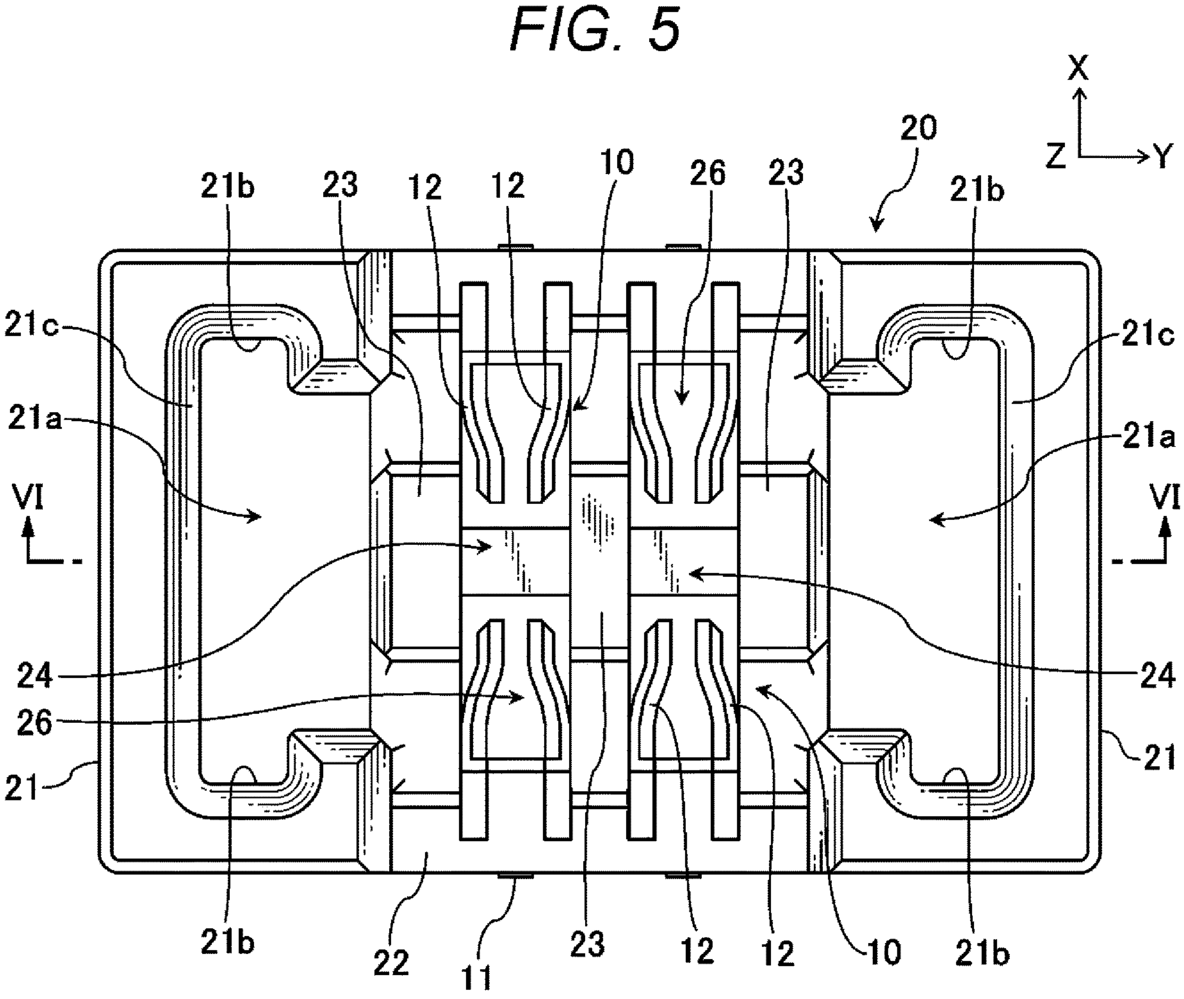
FIG. 5 is a plan view of a receptacle connector according to the embodiment of the present disclosure.
Figure 6:
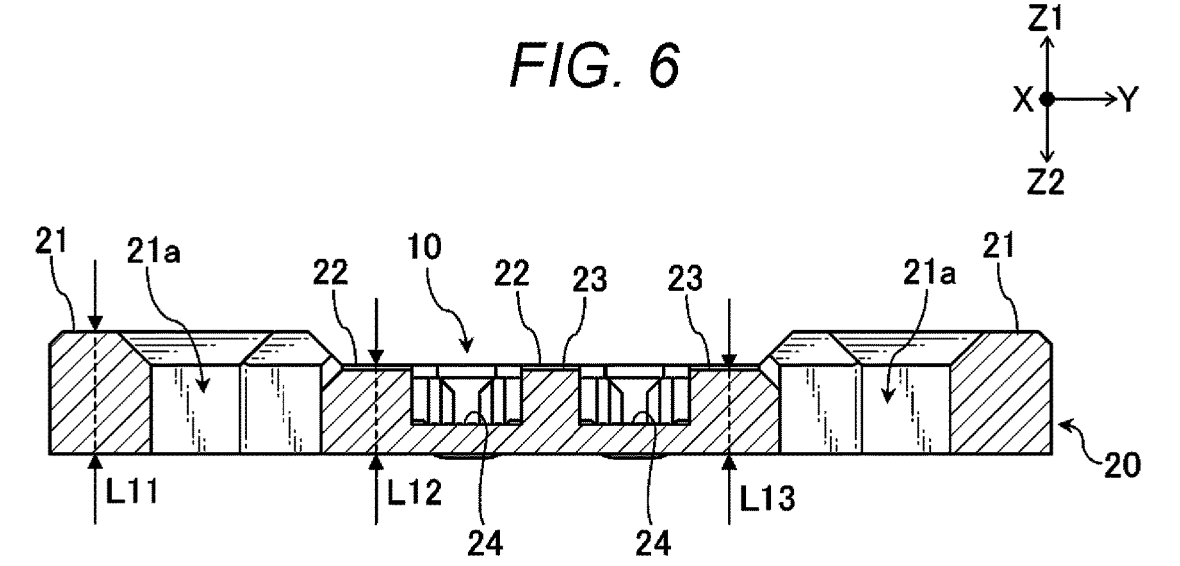
FIG. 6 is a sectional view of the receptacle connector according to the embodiment of the present disclosure along a VI-VI line of FIG. 5.
Figure 7:
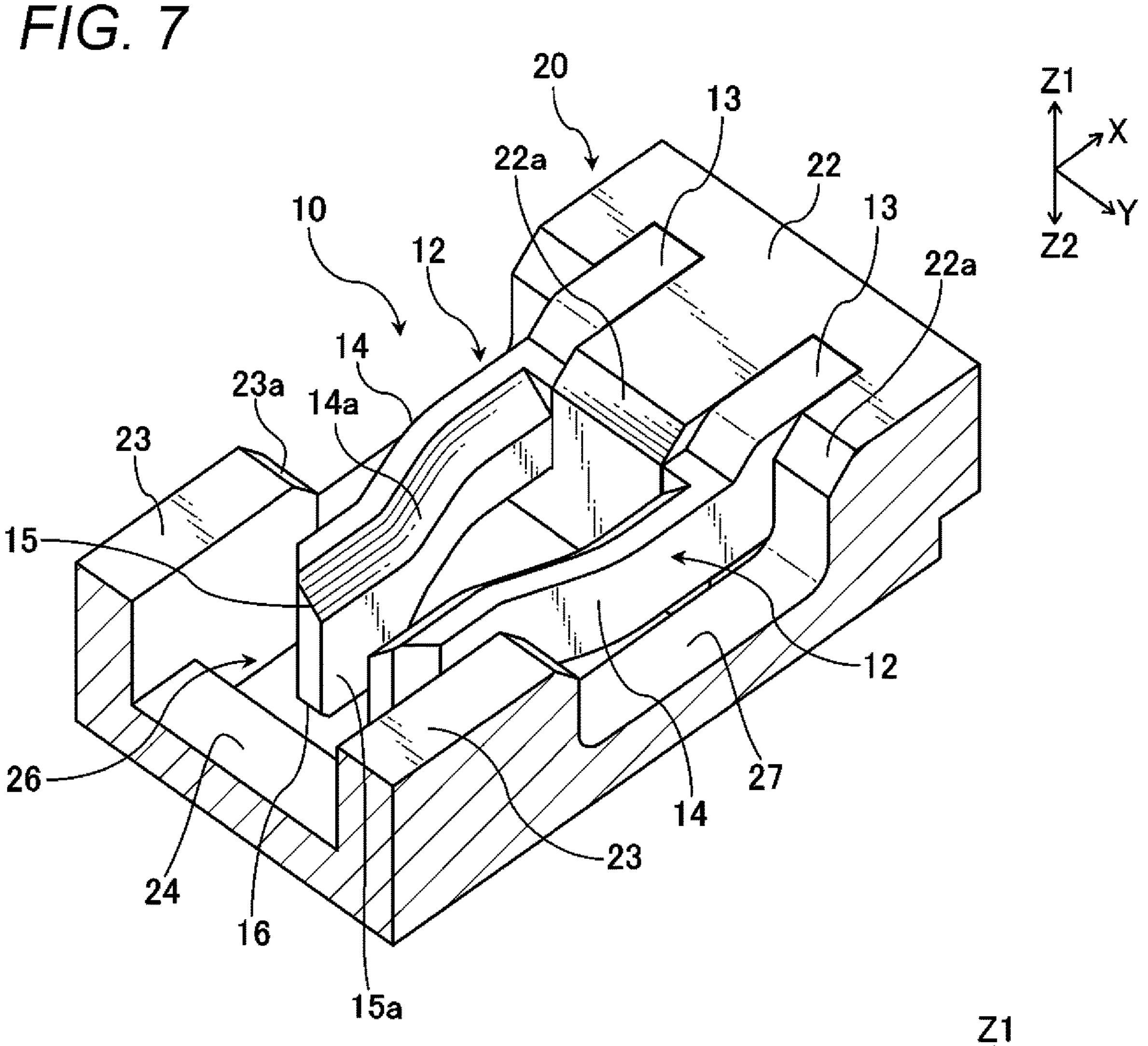
FIG. 7 is a perspective view of part of the receptacle connector according to the embodiment of the present disclosure.
Figure 8:
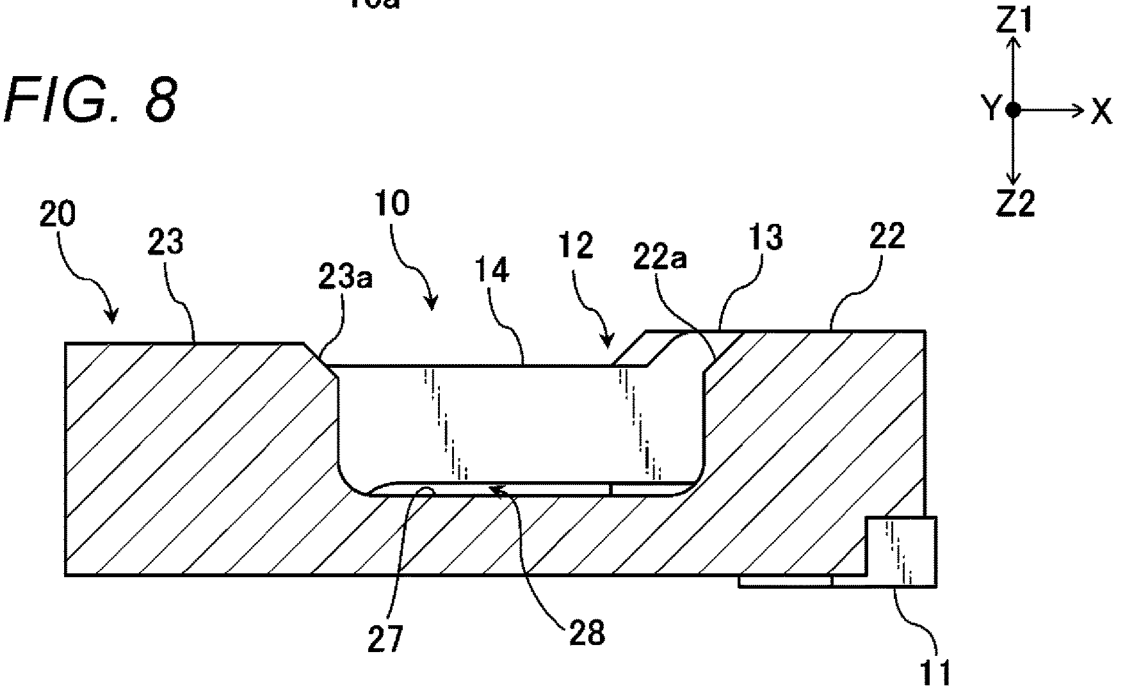
FIG. 8 is a side view of part of the receptacle connector according to the embodiment of the present disclosure.
Figure 9:
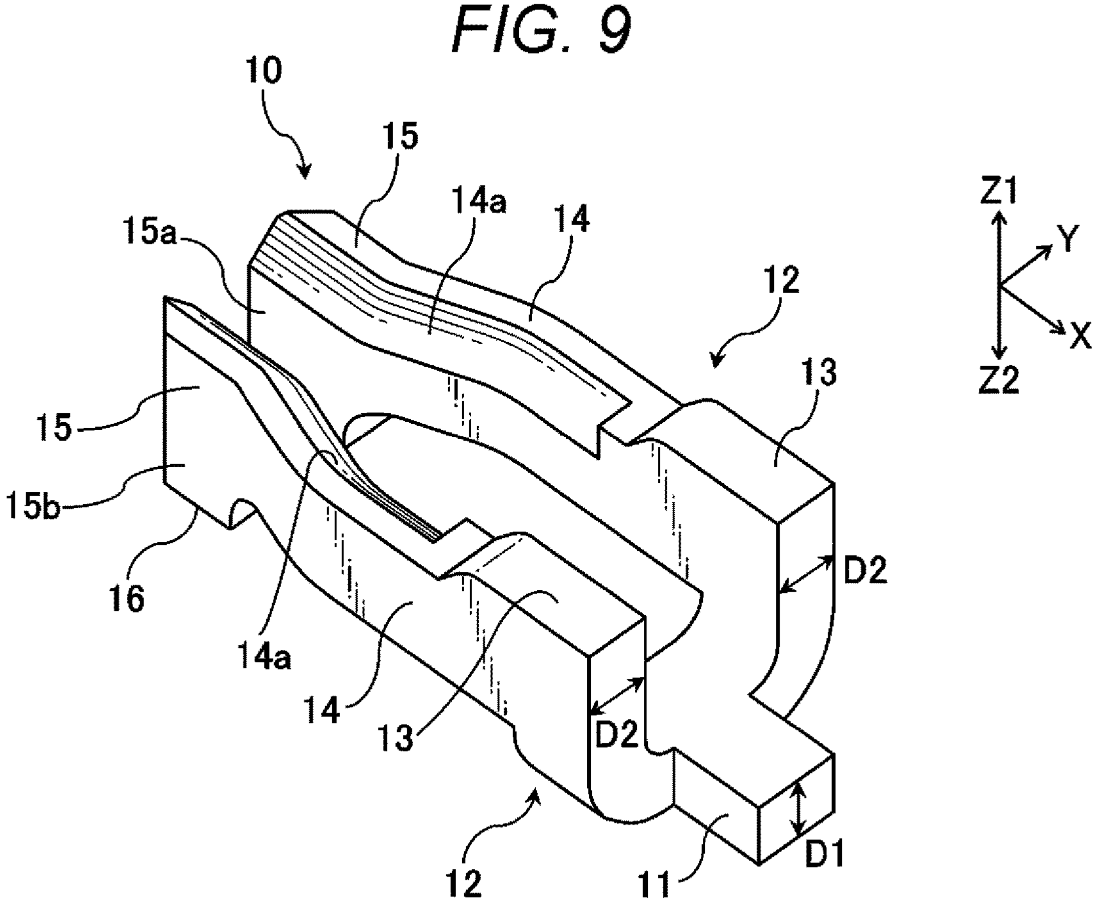
FIG. 9 is a perspective view of one terminal of the receptacle connector according to the embodiment of the present disclosure.
Figure 10:
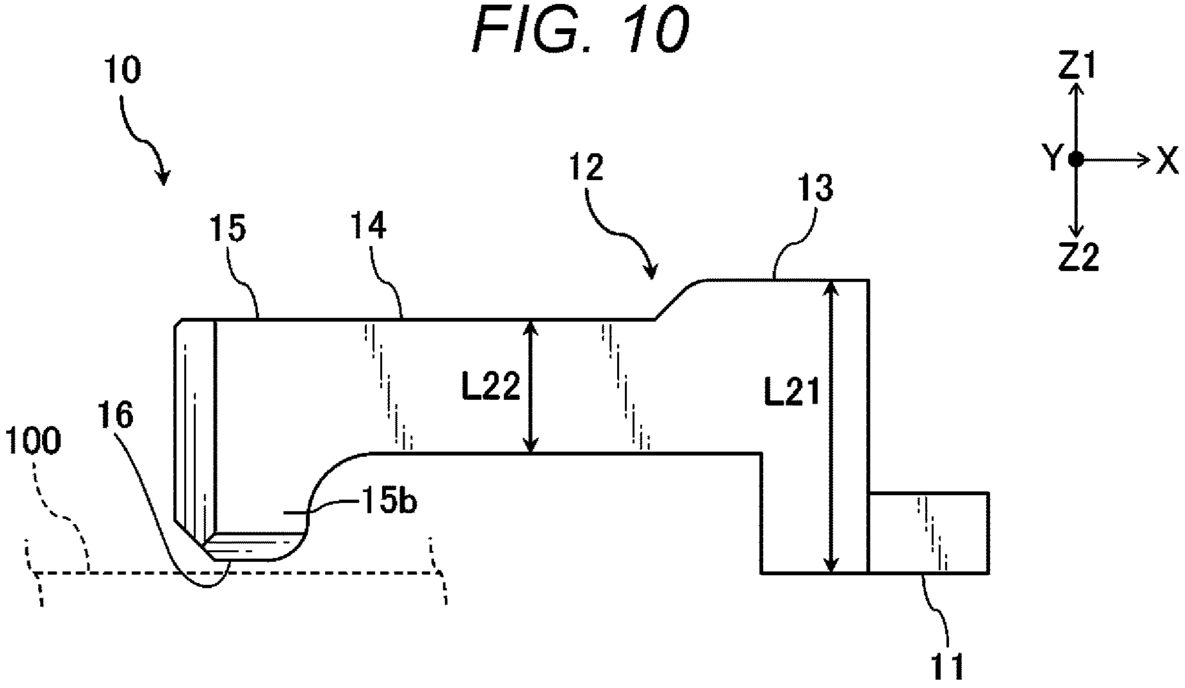
FIG. 10 is a side view of one terminal of the receptacle connector according to the embodiment of the present disclosure.
Figure 11:
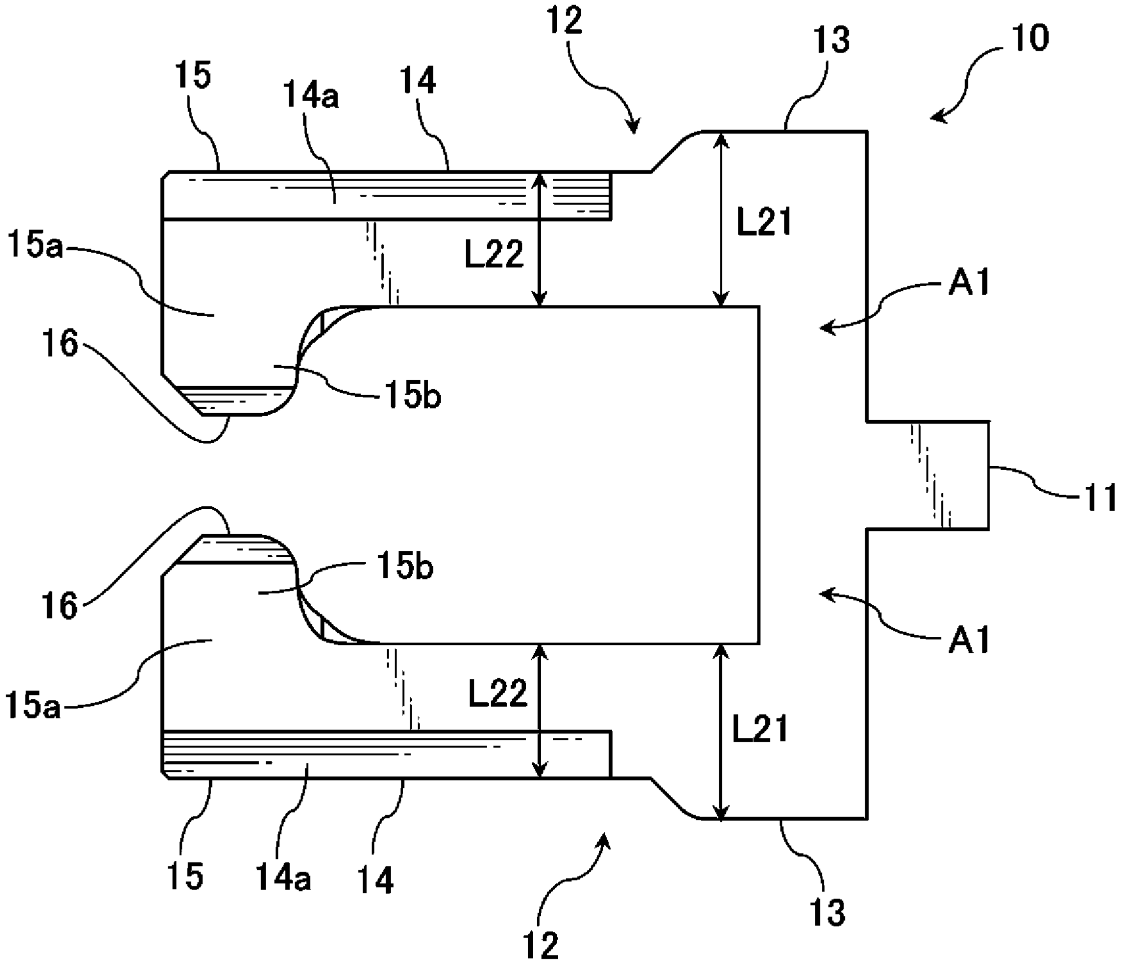
FIG. 11 is a development view of a plate-shaped member forming one terminal of the receptacle connector according to the embodiment of the present disclosure.

Next, the receptacle connector 2 according to the present embodiment will be specifically described with reference to FIGS. 5 to 11. FIG. 5 is a plan view of the receptacle connector 2 according to the present embodiment from above. FIG. 6 is a sectional view of the receptacle connector 2 according to the present embodiment along a VI-VI line of FIG. 5. FIG. 7 is a perspective view of part of the receptacle connector 2 according to the present embodiment, specifically one terminal 10 and part of the housing 20 therearound, diagonally from above. FIG. 8 is a side view of part of the receptacle connector 2 according to the present embodiment, specifically one terminal 10 and part of the housing 20 therearound, as viewed in the longitudinal direction Y. FIG. 9 is a perspective view of only one terminal 10 of the receptacle connector 2 according to the present embodiment diagonally from above. FIG. 10 is a side view of only one terminal 10 of the receptacle connector 2 according to the present embodiment as viewed in the longitudinal direction Y. FIG. 11 is a development view of a plate-shaped member forming one terminal 10 of the receptacle connector 2 according to the present embodiment before bending. Note that the configuration of the terminal 10 of the receptacle connector 2 will be mainly described herein. Moreover, description of contents overlapping with those described above with reference to FIGS. 1 and 2 will be omitted herein as necessary.

As shown in FIG. 5, the housing 20 of the receptacle connector 2 has, as described above, the first side walls 21 extending in the lateral direction X and the longitudinal direction Y and having the through-holes 21*a* with the recessed portions 21*b*, the second side walls 22 extending in the longitudinal direction Y and holding one ends of the terminals 10 in the lateral direction X, the three inner walls 23 provided adjacent to both sides of each terminal 10 in the longitudinal direction Y and extending in the lateral direction X, the two recessed portions 24 each provided between adjacent ones of the three inner walls 23 and configured to receive the holding portions 44 of the housing 40 of the plug connector 3, and the four through-holes 26 extending in the fitting direction Z so as to house part (specifically, contact piece 14) of the arm portions 12 of each of the four terminals 10.

As shown in FIG. 6, the length L11 of the first side wall 21 of the housing 20 in the fitting direction Z is longer than the length L12 of the second side wall 22 of the housing 20 in the fitting direction Z and the length L13 of the inner wall 23 of the housing 20 in the fitting direction Z (L11>L12, L13). That is, in the housing 20, the first side wall 21 extends longer than the second side wall 22 and the inner wall 23 in the upper direction Z1. In other words, the upper end of the first side wall 21 is positioned higher than the upper end of each of the second side wall 22 and the inner wall 23. With this configuration, when the receptacle connector 2 is fitted to the plug connector 3, the first side walls 21 of the housing 20 of the receptacle connector 2 can contact the plug connector 3 in advance of the second side walls 22 and the inner walls 23. As a result, rough alignment upon fitting can be made using the first side walls 21 forming the main outer walls (peripheral walls) of the housing 20, and thereafter, fine alignment can be made using the second side walls 22 and inner walls 23 of the housing 20. Note that in the housing 20, the length L12 of the second side wall 22 in the fitting direction Z is slightly longer than the length L13 of the inner wall 23 in the fitting direction Z (L12>L13).

Next, as shown in FIGS. 7 to 10, the terminal 10 of the receptacle connector 2 mainly has the mounting portion 11 for connecting the terminal 10 to the board by soldering and the pair of arm portions 12 coupled to the mounting portion 11 and extending in the lateral direction X and the upper direction Z1 from the mounting portion 11. The terminal 30 of the plug connector 3 is inserted into between one and the other arm portions 12 of the pair of arm portions 12. In this case, the pair of arm portions 12 is coupled to the mounting portion 11 integrated with the pair of arm portions 12, i.e., the pair of arm portions 12 shares one mounting portion 11. The arm portion 12 of the terminal 10 has a holding target portion 13 held on the second side wall 22 of the housing 20 and the contact piece 14 coupled to the holding target portion 13, extending in the lateral direction X from the holding target portion 13, and configured to contact the terminal 30 of the plug connector 3.

These contact pieces 14 of the terminal 10 are elastically deformable in the longitudinal direction Y when the terminal 30 of the plug connector 3 is inserted into between one and the other arm portions 12 of the pair of arm portions 12. Accordingly, the contact pieces 14 of the terminal 10 provide elastic force (contact pressure) to the terminal 30 of the plug connector 3. As a result, the contact pieces 14 of the arm portions 12 hold the terminal 30 of the plug connector 3, and electric connection between the terminal 10 of the receptacle connector 2 and the terminal 30 of the plug connector 3 is ensured. The pair of arm portions 12 is separated from each other so as to receive the holding portion 45 of the housing 40 of the plug connector 3 when the terminal 30 of the plug connector 3 is inserted into therebetween. The contact piece 14 of the arm portion 12 has, at the upper end thereof, an inclined surface 14*a* inclined to the lower direction Z2, and at an end portion opposite to the side coupled to the holding target portion 13 in the lateral direction X, has a contact portion 15 which is a portion configured to contact the terminal 30 of the plug connector 3.

In the present embodiment, the terminal 10 is configured such that the plate thickness direction D2 (along the longitudinal direction Y) of each of the pair of arm portions 12 (including the holding target portions 13 and the contact pieces 14) is perpendicular to the plate thickness direction D1 (along the fitting direction Z) of the mounting portion 11, as shown in FIG. 9. In other words, the terminal 10 is configured such that the plate surface (surface contacting a roller when the plate-shaped member, such as a metal plate, forming the terminal 10 is rolled, i.e., equivalent to a roll surface) of the arm portion 12 extends along the fitting direction Z. In the case of such a configuration of the terminal 10, the length of the contact piece 14 in the fitting direction Z is longer than that of a terminal configured such that the plate thickness direction of a contact piece is along the fitting direction Z as described in JP-A-2012-49013 and JP-A-5-217641, i.e., a terminal (hereinafter referred to as a “comparative example” as necessary) configured such that the plate surface of a contact piece extends perpendicularly to the fitting direction Z. Thus, according to the present embodiment, the amount of displacement of the contact piece 14 of the arm portion 12 in the fitting direction Z upon insertion of the terminal 30 of the plug connector 3 into the arm portions 12 or removal of the terminal 30 from the arm portions 12 can be decreased and buckling of the contact piece 14 can be reduced as compared to the comparative example.

As shown in FIG. 9, a protruding portion 15*b* protruding in the lower direction Z2 is formed at the contact portion 15 of the contact piece 14 of the arm portion 12 of the terminal 10. The inner surface (side surface facing the contact portion 15 of the opposing arm portion 12) of the contact portion 15, which includes a portion formed with the protruding portion 15*b*, in the longitudinal direction Y forms a contact surface 15*a* configured to contact the terminal 30 of the plug connector 3. Using the contact portions 15 including the protruding portions 15*b* extending in the lower direction Z2, the terminal 10 of the receptacle connector 2 is fitted to the terminal 30 of the plug connector 3 so that the length of contact (equivalent to an effective fitting length) of the terminal 10 with the terminal 30 along the fitting direction Z can be increased, i.e., the area of contact of the terminal 10 with the terminal 30 can be increased.

The tip end of the protruding portion 15*b* of the contact portion 15 of the contact piece 14 forms a restriction portion 16 that restricts displacement of the contact piece 14 in the lower direction Z2 when the terminal 30 of the plug connector 3 is inserted into between one and the other arm portions 12 of the pair of arm portions 12. In this case, when the terminal 30 of the plug connector 3 is inserted into between one and the other arm portions 12 of the pair of arm portions 12 and the contact pieces 14 displace in the lower direction Z2, the restriction portions 16 at the tip ends of the protruding portions 15*b* of the contact portions 15 contact the upper surface of the board 100 (see FIG. 10), thereby restricting further displacement of the contact piece 14 in the lower direction Z2. With this configuration, buckling of the contact pieces 14 upon insertion of the terminal 30 of the plug connector 3 can be effectively reduced. Specifically, such a restriction portion 16 is provided at an end portion (i.e., contact portion 15), at which displacement of the contact piece 14 is the greatest upon fitting, in the lateral direction X, and therefore, buckling of the contact piece 14 can be more effectively reduced.

As shown in FIG. 7, the above-described contact pieces 14 of the pair of arm portions 12 of the terminal 10 are housed in the through-hole 26 of the housing 20. The inner wall 23 of the housing 20 is provided adjacent to each of the contact pieces 14 of the pair of arm portions 12 in the longitudinal direction Y (also see FIGS. 1 and 5). That is, the pair of arm portions 12 is sandwiched by the pair of inner walls 23 on both sides in the longitudinal direction Y. With the inner walls 23 of the housing 20, displacement of the pair of arm portions 12 in the longitudinal direction Y can be restricted when the terminal 30 of the plug connector 3 is inserted into between one and the other arm portions 12 of the pair of arm portions 12 of the terminal 10. As a result, it is possible to avoid contact of the pair of arm portions 12, which is expanded in the longitudinal direction Y due to insertion of the terminal 30 of the plug connector 3, with the arm portions 12 of adjacent terminals 10.

As shown in FIG. 8, the inner wall 23 of the housing 20 extends longer in the upper direction Z1 than the contact piece 14 of the terminal 10. In other words, the upper end of the inner wall 23 is positioned higher than the upper end of the contact piece 14. With this configuration, the inner walls 23 of the housing 20 can contact the plug connector 3 in advance of the contact pieces 14 of the terminals 10 when the receptacle connector 2 is fitted to the plug connector 3. Thus, the inner walls 23 of the housing 20 can first guide alignment upon fitting (specifically, inclined surfaces 23*a* formed at the upper ends of the inner walls 23 effectively guide such alignment), and thereafter, each terminal 30 of the plug connector 3 can be inserted into between the pair of contact pieces 14 of a corresponding one of the terminals 10. As a result, buckling of the contact piece 14 of the terminal 10 due to contact of the not-properly-aligned terminal 30 of the plug connector 3 with the contact piece 14 can be reduced.

As shown in FIGS. 7 and 8, the inner wall 23 of the housing 20 is formed with a cutout portion 27 which extends in the lower direction Z2 from the upper end of the inner wall 23. Specifically, the cutout portion 27 is formed in a portion of the inner wall 23 other than a portion substantially corresponding to the contact portion 15 of the contact piece 14. These cutout portions 27 formed in the inner walls 23 of the housing 20 are used in insert molding of the receptacle connector 2. Specifically, the cutout portions 27 of the inner walls 23 are used for sandwiching the contact pieces 14 of the terminal 10 in the longitudinal direction Y with a mold for insert molding.

In addition, as shown in FIG. 8, a clearance 28 is formed between an end portion (i.e., upper end of the portion of the inner wall 23 formed with the cutout portion 27) of the cutout portion 27 of the housing 20 and the lower end of the contact piece 14 of the terminal 10 in the fitting direction Z. These clearances 28 are also used in insert molding of the receptacle connector 2. Specifically, upper and lower molds for the receptacle connector 2 overlap with each other in the clearances 28 in insert molding, and more specifically, the lower mold is arranged in the clearances 28 and the upper mold is arranged outside the clearances 28 in the longitudinal direction Y. In this manner, part of the housing 20 around the contact pieces 14 can be properly molded from resin. For example, leakage of the resin from a clearance between the contact piece 14 and the cutout portion 27 can be reduced.

As shown in FIG. 11, the terminal 10 of the receptacle connector 2 is formed in such a manner that a piece of plate-shaped member (e.g., metal plate) that has been cut and molded is bent at a portion indicated by arrows A1. Specifically, the plate-shaped member is curved at the portion indicated by the arrows A1 such that portions corresponding to the pair of arm portions 12 stand. The pair of arm portions 12 of the terminal 10 is configured such that the length L21 of the holding target portion 13 is longer than the length L22 of the contact piece 14 (precisely, portion of the contact piece 14 other than the contact portion 15) (also see FIG. 10). With this configuration, stress due to warpage of the contact pieces 14 when the terminal 30 of the plug connector 3 is inserted into between one and the other arm portions 12 of the pair of arm portions 12 can be effectively absorbed by the holding target portions 13 formed longer than the contact pieces 14. As a result, the elasticity of the contact pieces 14 can be properly ensured.

Note that in a case where the contact piece 14 is formed with a long length L22 in order to ensure the elasticity of the contact piece 14, it is disadvantageous in terms of a demand for thickness reduction in some cases. On the other hand, the holding target portion 13 is held on the second side wall 22 of the housing 20, and in the present embodiment, the length L21 of the holding target portion 13 is substantially the same as the length L12 of the second side wall 22. In the present embodiment, a portion of the second side wall 22 including the holding target portion 13 is positioned outside the plug connector 3 upon fitting of the connectors 2, 3, and therefore, it is not disadvantageous in terms of the demand for thickness reduction even if the holding target portion 13 is formed with a long length L21.

The holding target portion 13 of the terminal 10 is configured such that the upper surface thereof in the upper direction Z1 is exposed on the second side wall 22 of the housing 20 (see FIGS. 7 and 8). With this configuration, the terminal 10 can be inspected by contacting an inspection pin with such an exposed portion of the holding target portion 13.

[Fitting of Terminals]

Figure 12A:
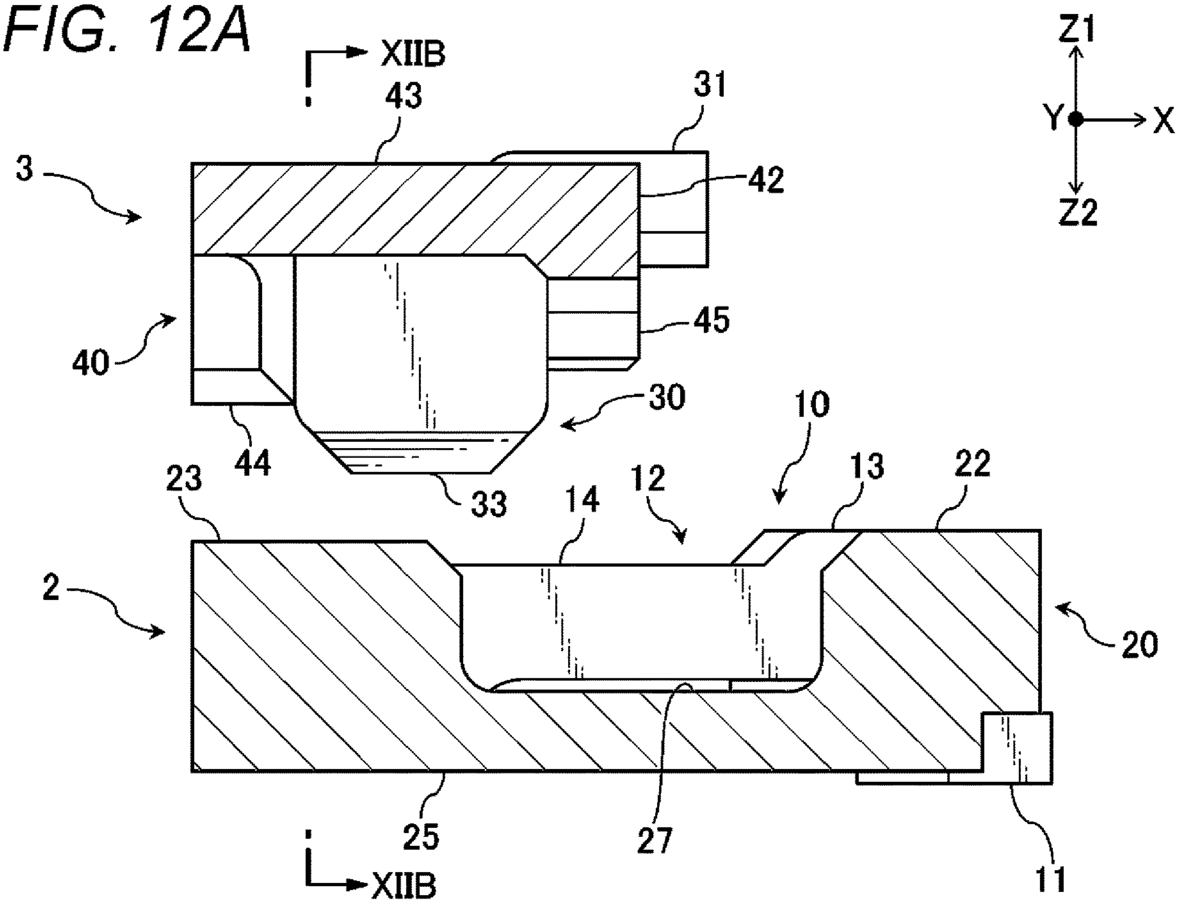
FIG. 12A is a side view of the receptacle connector and the plug connector according to the embodiment of the present disclosure before fitting.
Figure 12B:
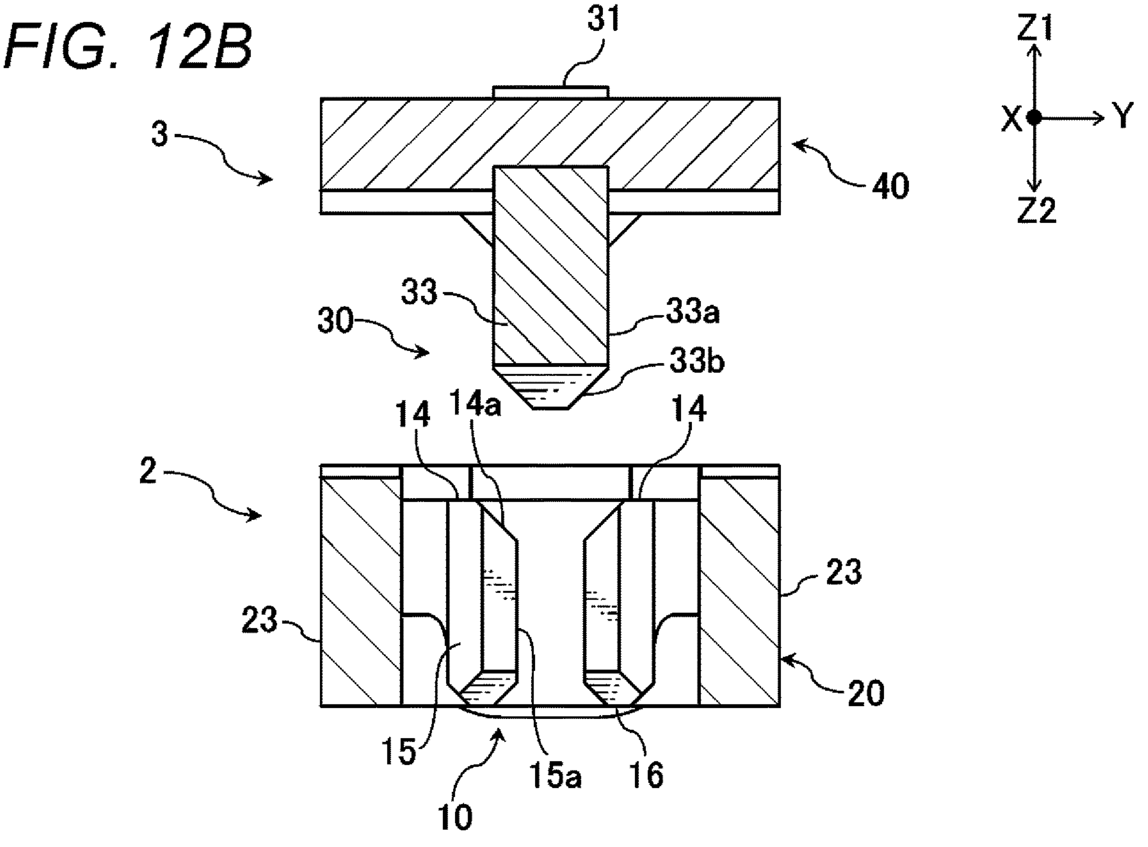
FIG. 12B is a sectional view of the receptacle connector and the plug connector according to the embodiment of the present disclosure along an XIIB-XIIB line of FIG. 12A.
Figure 13A:
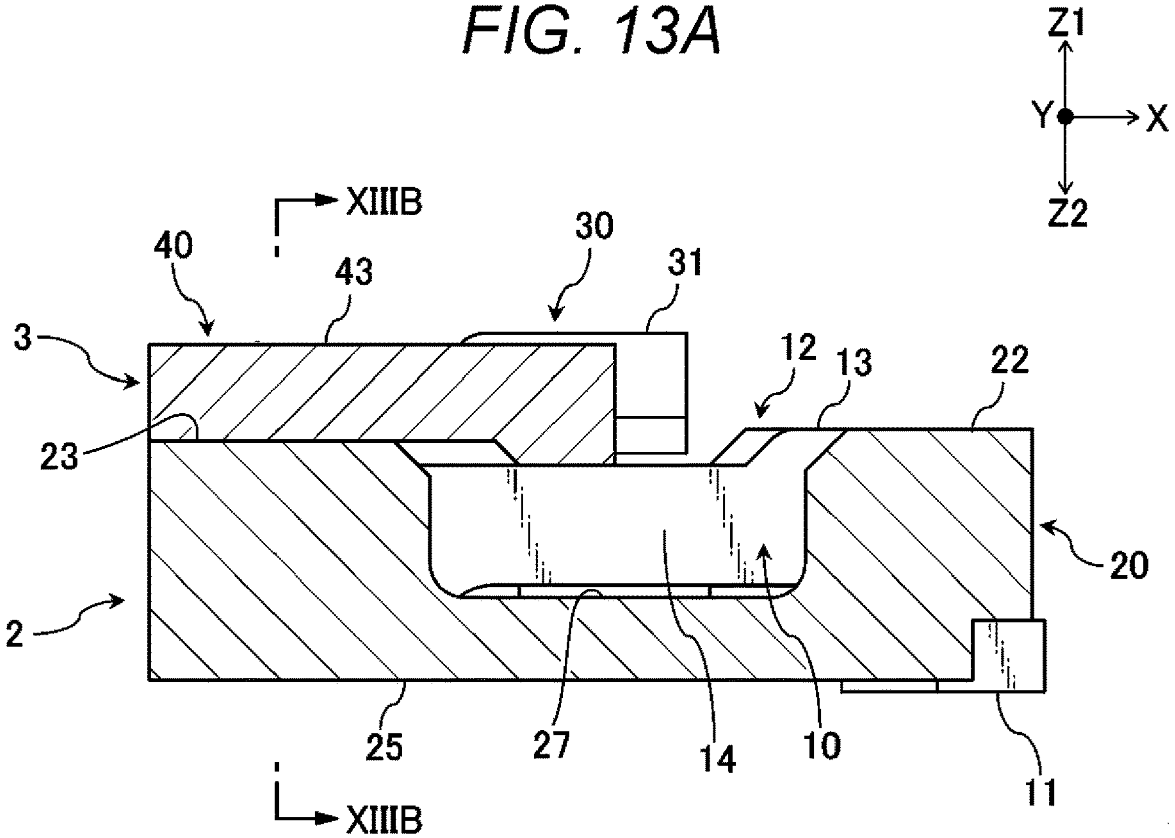
FIG. 13A is a side view of the receptacle connector and the plug connector according to the embodiment of the present disclosure upon fitting.

Next, fitting of the terminal 10 of the receptacle connector 2 and the terminal 30 of the plug connector 3 will be described with reference to FIGS. 12A, 12B, 13A, and 13B. FIG. 12A is a side view before fitting of the connectors 2, 3 according to the present embodiment. Specifically, FIG. 12A is a side view of part of the connectors 2, 3, more specifically one terminal 10, one terminal 30, and part of the housings 20, 40 therearound, as viewed in the longitudinal direction Y. Moreover, FIG. 12B is a sectional view along an XIIB-XIIB line of FIG. 12A. FIG. 13A is a side view upon fitting of the connectors 2, 3 according to the present embodiment. Specifically, FIG. 13A is a side view of part of the connectors 2, 3, more specifically one terminal 10, one terminal 30, and part of the housings 20, 40 therearound, as viewed in the longitudinal direction Y. Moreover, FIG. 13B is a sectional view along an line of FIG. 13A.

As shown in FIGS. 12A and 12B, before fitting of the connectors 2, 3, the connectors 2, 3 are aligned with each other in the lateral direction X and the longitudinal direction Y such that the contact portion 33 of each terminal 30 of the plug connector 3 is inserted into between one and the other arm portions 12 of the pair of arm portions 12 of a corresponding one of the terminals 10 of the receptacle connector 2, more specifically between one and the other contact pieces 14 of the pair of contact pieces 14 (much more specifically between the contact portions 15 of the pair of contact pieces 14). In this case, as described above, alignment for fitting the housing 20 of the receptacle connector 2 and the housing 40 of the plug connector 3 to each other is guided by, inter alia, the first side walls 21, second side walls 22, and inner walls 23 of the housing 20 of the receptacle connector 2, the first side walls 41 of the housing 40 of the plug connector 3, and the inclined surfaces 21*c*, 22*a*, 23*a*, 41*b* formed at the upper ends of these walls. When the contact portion 33 of each terminal 30 of the plug connector 3 is inserted into between the pair of contact pieces 14 of a corresponding one of the terminals 10 of the receptacle connector 2, such insertion is guided by the inclined surfaces 33*b* of the contact portions 33 of the terminals 30 and the inclined surfaces 14*a* of the contact pieces 14 of the terminals 10.

Figure 13B:
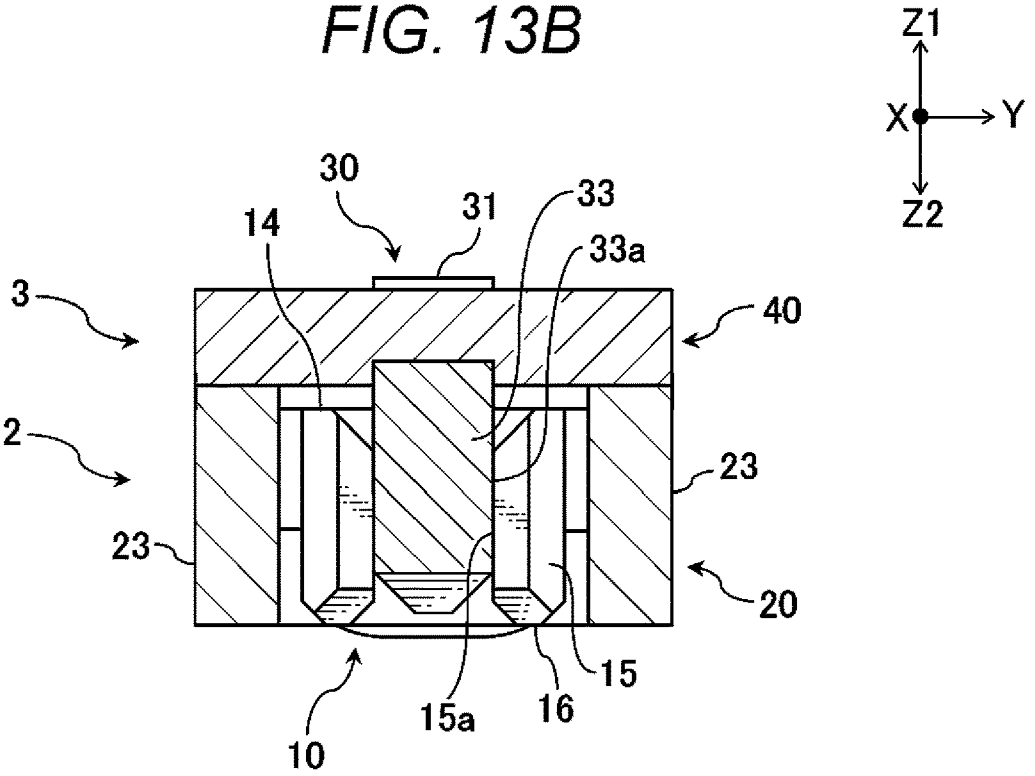
FIG. 13B is a sectional view of the receptacle connector and the plug connector according to the embodiment of the present disclosure along an XIIIB-XIIIB line of FIG. 13A.

Thereafter, when insertion of the contact portion 33 of each terminal 30 of the plug connector 3 into between the pair of contact pieces 14 of a corresponding one of the terminals 10 of the receptacle connector 2 ends, the connectors 2, 3 are brought into a fitting state as shown in FIGS. 13A and 13B. In this fitting state, the contact surfaces 15*a* inside each pair of contact pieces 14 of the terminals 10 of the receptacle connector 2 in the longitudinal direction Y and the contact surfaces 33*a* on both sides of each contact portion 33 of the terminals 30 of the plug connector 3 in the longitudinal direction Y contact each other. In this case, the pair of contact pieces 14 of the terminal 10 of the receptacle connector 2 is elastically deformed outward in the longitudinal direction Y. Force (elastic force, contact pressure) of the contact pieces 14 returning to an original shape is provided to the contact portion 33 of the terminal 30 of the plug connector 3, and accordingly, electric connection between the terminal 10 of the receptacle connector 2 and the terminal 30 of the plug connector 3 is ensured. Upon such fitting, the contact pieces 14 of the terminal 10 of the receptacle connector 2 are displaced in the lower direction Z2 by insertion of the terminal 30 of the plug connector 3, and accordingly, the restriction portions 16 at the lower ends of the contact portions 15 of the contact pieces 14 tend to contact the upper surface of the board 100 (also see FIG. 10). Thus, displacement of the contact pieces 14 in the lower direction Z2 is restricted.

Features and Advantageous Effects

Next, features and advantageous effects of the receptacle connector 2 according to the above-described present embodiment will be described.

In the receptacle connector 2 according to the present embodiment, each terminal 10 has the mounting portion 11 to be mounted on the predetermined member such as the board 100 and the pair of arm portions 12 coupled to the mounting portion 11, extending in the lateral direction X from the mounting portion 11, and configured such that the terminal 30 of the plug connector 3 is inserted into therebetween. Each of the one arm portion 12 and the other arm portions 12 of the pair of arm portions 12 has the holding target portion 13 held on the housing 20 and the contact piece 14 coupled to the holding target portion 13 and configured to contact the terminal 30 of the plug connector 3. The terminal 10 has the mounting portion 11 and the pair of arm portions 12, each of which is formed of the plate-shaped member, and is configured such that the plate thickness direction D2 of the pair of arm portions 12 is substantially perpendicular to the plate thickness direction D1 of the mounting portion 11.

That is, in the present embodiment, in the receptacle connector 2, the terminal 10 is configured such that the plate surface of the arm portion 12 extends along the fitting direction Z. In the case of such a configuration of the terminal 10, the length of the contact piece 14 in the fitting direction Z is longer than that of the terminal according to the comparative example where the plate thickness direction of the contact piece is along the fitting direction Z (in other words, the plate surface of the contact piece extends perpendicularly to the fitting direction Z). Thus, according to the present embodiment, the amount of displacement of the contact piece 14 of the arm portion 12 in the fitting direction Z upon insertion of the terminal 30 of the plug connector 3 into the arm portions 12 or removal of the terminal 30 from the arm portions 12 can be decreased and buckling of the contact piece 14 can be reduced as compared to the comparative example.

Thus, according to the present embodiment, there is no need to hold the contact pieces 14 of the terminal 10 by the housing 20 in the fitting direction Z, specifically to sandwich the upper and lower sides of the contact pieces 14 by the housing 20 to form a housing-terminal-housing three-layer structure as in the comparative example. Thus, the terminal 10 can be reduced in thickness. In addition, according to the present embodiment, there is no need to provide the housing 20 on both sides of the contact pieces 14 in the longitudinal direction Y in a case where the contact pieces 14 are held by the housings 20 in the fitting direction Z as in the comparative example. Thus, the size of the receptacle connector 2 in the longitudinal direction Y can be also reduced.

In the receptacle connector 2 according to the present embodiment, the housing 20 has the through-holes 26 extending in the fitting direction Z. The through-hole 26 penetrates the housing 20 along the fitting direction Z. The contact pieces 14 of the terminal 10 are housed in the through-hole 26. Since the contact pieces 14 of the terminal 10 are provided in the through-hole 26 where the housing 20 is not present on the upper and lower sides, the terminal 10 can be effectively reduced in thickness.

In the receptacle connector 2 according to the present embodiment, the contact piece 14 of the terminal 10 has, at the lower end portion thereof, the restriction portion 16 that restricts displacement of the contact piece 14 in the lower direction Z2 when the terminal 30 of the plug connector 3 is inserted into between one and the other arm portions 12 of the pair of arm portions 12. In this case, even when the contact piece 14 is displaced in the lower direction Z2 due to insertion of the terminal 30 of the plug connector 3, further displacement of the contact piece 14 in the lower direction Z2 can be reduced by the restriction portion 16 of the lower end portion of the contact piece 14 contacting the upper surface of the board 100. Thus, buckling of the contact piece 14 upon insertion of the terminal 30 of the plug connector 3 can be effectively reduced.

In the receptacle connector 2 according to the present embodiment, the contact piece 14 of the terminal 10 has, at the end portion opposite to the side coupled to the holding target portion 13 in the lateral direction X, the contact portion 15 configured to contact the terminal 30 of the plug connector 3. The contact portion 15 is formed so as to protrude in the lower direction Z2, and the restriction portion 16 is provided at the tip end of such a protruding portion (protruding portion 15*b*). The terminal 10 of the receptacle connector 2 and the terminal 30 of the plug connector 3 are fitted to each other using the contact portions 15 including these protruding portions 15*b* so that the length of contact (equivalent to the effective fitting length) of the terminal 10 with the terminal 30 along the fitting direction Z can be increased, i.e., the area of contact of the terminal 10 with the terminal 30 can be increased. Moreover, the above-described restriction portion 16 is provided at the contact portion 15 of the contact piece 14. That is, the restriction portion 16 is provided at the end portion, at which displacement of the contact piece 14 is the greatest upon fitting, of the contact piece 14 in the lateral direction X so that buckling of the contact piece 14 can be more effectively reduced.

In the receptacle connector 2 according to the present embodiment, the length L21 of the holding target portion 13 of the terminal 10 in the fitting direction Z is longer than the length L22 of the contact piece 14 of the terminal 10 in the fitting direction Z. Thus, the stress due to warpage of the contact pieces 14 when the terminal 30 of the plug connector 3 is inserted into between one and the other arm portions 12 of the pair of arm portions 12 can be effectively absorbed by the holding target portions 13 formed longer than the contact pieces 14. As a result, the elasticity of the contact pieces 14 can be properly ensured.

In the receptacle connector 2 according to the present embodiment, the contact piece 14 of the terminal 10 has the inclined surface 14*a* at the upper end. With the inclined surfaces 14*a* formed at the contact pieces 14, insertion of the terminal 30 of the plug connector 3 into between the arm portions 12 can be properly guided.

In the receptacle connector 2 according to the present embodiment, one and the other arm portions 12 of the pair of arm portions 12 of the terminal 10 are separated from each other so as to receive part (holding portion 45) of the housing 40 of the plug connector 3 when the terminal 30 of the plug connector 3 is inserted into between one and the other arm portions 12 of the pair of arm portions 12. Thus, upon fitting of the connectors 2, 3, interference between the arm portions 12 of the terminals 10 of the receptacle connector 2 and part of the housing 40 of the plug connector 3 can be properly reduced.

In the receptacle connector 2 according to the present embodiment, the pair of arm portions 12 of the terminal 10 is coupled to the mounting portion 11 integrated with the pair of arm portions 12. The pair of arm portions 12 shares one mounting portion 11 as described above so that the configuration of the terminal 10 can be simplified.

In the receptacle connector 2 according to the present embodiment, the housing 20 has, near the edges thereof, the recessed portions 21*b* with which the raised portions 41*a* formed at the housing 40 of the plug connector 3 engage. Using the recessed portions 21*b* formed in the housing 20 of the receptacle connector 2 and the raised portions 41*a* formed at the housing 40 of the plug connector 3 as described above, alignment for fitting of the receptacle connector 2 and the plug connector 3, specifically fitting of the housing 20 of the receptacle connector 2 and the housing 40 of the plug connector 3, can be properly guided.

The receptacle connector 2 according to the present embodiment has the multiple terminals 10 arrayed along the fitting direction Z and the longitudinal direction Y. The housing 20 has the pair of inner walls 23 provided adjacent to each of a plurality of pairs of arm portions 12 of a plurality of the terminals 10 in the longitudinal direction Y and extending in the lateral direction X. According to the inner walls 23 of the housing 20 as described above, even when the pair of arm portions 12 is displaced in the longitudinal direction Y due to insertion of the terminal 30 of the plug connector 3, the pair of arm portions 12 contacts the inner walls 23 so that further displacement of the pair of arm portions 12 in the longitudinal direction Y can be reduced. The pair of arm portions 12 expanded in the longitudinal direction Y due to insertion of the terminal 30 of the plug connector 3 can be inhibited from contacting the arm portions 12 of adjacent terminals 10.

In the receptacle connector 2 according to the present embodiment, the cutout portion 27 extending in the fitting direction Z is formed in part of the inner wall 23 of the housing 20. The clearance 28 is formed between the end portion of the cutout portion 27 and the end portion of the contact piece 14 of the terminal 10 in the fitting direction Z. With these cutout portions 27 formed in the inner walls 23 of the housing 20, the terminals 10 can be properly insert-molded into the housing 20. With the clearances 28 between the cutout portions 27 of the inner walls 23 of the housing 20 and the contact pieces 14 of the terminal 10, part of the housing 20 around the contact pieces 14 can be properly formed from resin by insert molding. For example, leakage of the resin from the clearance between the contact piece 14 and the cutout portion 27 can be reduced.

In the receptacle connector 2 according to the present embodiment, the inner wall 23 of the housing 20 extends longer in the upper direction Z1 than the contact piece 14 of the terminal 10. That is, the upper end of the inner wall 23 is positioned higher than the upper end of the contact piece 14. With this configuration, the inner walls 23 of the housing 20 can contact the plug connector 3 in advance of the contact pieces 14 of the terminals 10 when the receptacle connector 2 is fitted to the plug connector 3. Thus, alignment upon fitting can be guided by the inner walls 23 of the housing 20, and thereafter, the terminals 30 of the plug connector 3 can contact the contact pieces 14 of the terminals 10. As a result, buckling of the contact pieces 14 due to contact of the not-properly-aligned terminal 30 of the plug connector 3 with the contact pieces 14 of the terminal 10 can be reduced.

In the receptacle connector 2 according to the present embodiment, the housing 20 has the first side walls 21 provided outside the inner walls 23 and extending longer in the upper direction Z1 than the inner walls 23. That is, the upper end of the first side wall 21 is positioned higher than the upper end of the inner wall 23. With this configuration, the first side walls 21 of the housing 20 of the receptacle connector 2 can contact the plug connector 3 in advance of the inner walls 23 of the housing 20 when the receptacle connector 2 is fitted to the plug connector 3. As a result, rough alignment upon fitting can be made using the first side walls 21 forming the main outer walls (peripheral walls) of the housing 20, and thereafter, fine alignment can be made using the inner walls 23 of the housing 20.

Modifications

Next, modifications of the above-described present embodiment will be described.

In the above-described present embodiment, the terminal 10 of the receptacle connector 2 is configured such that the pair of arm portions 12 is coupled to the mounting portion 11 integrated with the pair of arm portions 12, i.e., the pair of arm portions 12 shares one mounting portion 11. However, the present disclosure is not limited to above. As a modification, two separate mounting portions may be provided at the terminal 10, and one and the other arm portions 12 of the pair of arm portions 12 may be each coupled to the separate mounting portions. In this case, the two mounting portions may have the same potential.

In the above-described present embodiment, the recessed portions 21*b* as engagement target portions are formed in the housing 20 of the receptacle connector 2, the raised portions 41*a* as engagement portions are formed at the housing 40 of the plug connector 3, and the raised portions 41*a* engage with the recessed portions 21*b* upon fitting of the connectors 2, 3. However, the present disclosure is not limited to above. As a modification, an engagement portion such as a raised portion may be formed at the housing 20 of the receptacle connector 2, an engagement target portion such as a recessed portion may be formed at the housing 40 of the plug connector 3, and these portions may engage with each other upon fitting of the connectors 2, 3. The configurations of the engagement portion and the engagement target portion are not limited to use of the raised portion and the recessed portion, and other configurations may be used.

In the above-described present embodiment, the terminal 10 of the receptacle connector 2 is configured such that the plate thickness direction D2 of the pair of arm portions 12 is perpendicular to the plate thickness direction D1 of the mounting portion 11, but is not limited to a configuration of the plate thickness direction D2 of the pair of arm portions 12 being precisely perpendicular to the plate thickness direction D1 of the mounting portion 11. That is, the terminal 10 of the receptacle connector 2 may be configured such that the plate thickness direction D2 of the pair of arm portions 12 is substantially perpendicular to the plate thickness direction D1 of the mounting portion 11 (in other words, an angle between the plate thickness direction D2 and the plate thickness direction D1 is shifted from 90 degrees by several degrees).

In the above-described present embodiment, the example where the receptacle connector 2 is formed by integral molding (insert molding) has been described, but as a modification, the receptacle connector 2 may be formed by press-fitting.

Note that the above-described embodiments are examples for describing the present disclosure and the present disclosure is not limited to these embodiments. The present disclosure can be implemented in various forms without departing from the gist of the present disclosure.

The electric connector according to the present disclosure can be used for the purpose of, e.g., connecting boards to each other through a flat cable in an electronic device that transmits an electric signal at high speed, such as a smartphone or a mobile phone.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An electric connector comprising:
a terminal; and
a housing holding the terminal,
wherein the terminal has a mounting portion and a pair of arm portions,
the pair of arm portions is coupled to the mounting portion, extends in a lateral direction of the electric connector from the mounting portion, and is configured such that a terminal of a partner connector is inserted into between one and other arm portions of the pair of arm portions,
each of the one arm portion and the other arm portion of the pair of arm portions has a holding target portion and a contact piece, the holding target portion is held on the housing, and the contact piece is coupled to the holding target portion and is configured to contact the terminal of the partner connector,
the mounting portion and the pair of arm portions are formed of a plate-shaped member, and a plate thickness direction of the pair of arm portions is substantially perpendicular to a plate thickness direction of the mounting portion, and
the housing has a portion extending in the lateral direction and located between the holding target portion of the one arm portion and the holding target portion of the other arm portion.

2. The electric connector according to claim 1, wherein
the housing has a through-hole, and
the through-hole penetrates the housing along a fitting direction of fitting to the partner connector, and the contact piece is housed in the through-hole.

3. The electric connector according to claim 1, wherein
a length of the holding target portion in a fitting direction of fitting to the partner connector is longer than a length of the contact piece in the fitting direction.

4. The electric connector according to claim 1, wherein
the contact piece has an inclined surface at an end portion on a side on which the partner connector is inserted in a fitting direction of fitting to the partner connector.

5. The electric connector according to claim 1, wherein
the one and other arm portions of the pair of arm portions are separated from each other so as to receive part of a housing of the partner connector when the terminal of the partner connector is inserted into between the one and other arm portions of the pair of arm portions.

6. The electric connector according to claim 1, wherein
the pair of arm portions of the terminal is coupled to the mounting portion integrated with the pair of arm portions.

7. The electric connector according to claim 1, wherein
the housing has, near an edge of the housing, an engagement target portion to be engaged with an engagement portion formed at a housing of the partner connector or an engagement portion to be engaged with an engagement target portion formed at the housing of the partner connector.

8. The electric connector according to claim 1, wherein
the portion includes one side surface and the other side surface, the one side surface faces the holding target portion of the one arm portion and is in direct contact with the holding target portion of the one arm portion, and the other side surface faces the holding target portion of the other arm portion and is in direct contact with the holding target portion of the other arm portion.

9. The electric connector according to claim 1, wherein the contact piece has a restriction portion, and the restriction portion is provided at an end portion of the contact piece opposite to a side on which the partner connector is inserted in the fitting direction of fitting to the partner connector, and restricts displacement of the contact piece in the fitting direction when the terminal of the partner connector is inserted into between the one and other arm portions of the pair of arm portions.

10. The electric connector according to claim 9, wherein the contact piece has a contact portion, the contact portion is provided at an end portion opposite to a side coupled to the holding target portion in the lateral direction, and is configured to contact the terminal of the partner connector, and the restriction portion is formed at a tip end of a portion, which is formed so as to protrude to a side opposite to the side on which the partner connector is inserted in the fitting direction, of the contact portion.

11. The electric connector according to claim 1, wherein the terminal of the electric connector includes a plurality of the terminals arrayed along a longitudinal direction of the electric connector, the housing has an inner wall, and the inner wall extends in the lateral direction, and is provided adjacent to each of a plurality of the pairs of arm portions of the plurality of the terminals.

12. The electric connector according to claim 11, wherein the inner wall of the housing has a cutout portion, and the cutout portion is formed such that part of the inner wall is cut out in a fitting direction of fitting to the partner connector, and a clearance is formed between an end portion of the cutout portion and a lower end of the contact piece in the fitting direction.

13. The electric connector according to claim 11, wherein a length of the inner wall in the fitting direction is longer than a length of the contact piece in the fitting direction.

14. The electric connector according to claim 11, wherein the housing has a side wall, and the side wall is provided outside the inner wall, and a length of the side wall in the fitting direction is longer than a length of the inner wall in the fitting direction.

15. An electric connector comprising:

a terminal; and a housing holding the terminal, wherein the terminal has a mounting portion and a pair of arm portions, each of the one arm portion and the other arm portion of the pair of arm portions has a holding target portion held on the housing and a contact piece coupled to the holding target portion and configured to contact a terminal of a partner connector, the housing has a through-hole, the through-hole penetrates the housing along a fitting direction of fitting to the partner connector, and the contact pieces are housed in the through-hole, and the housing has a portion extending in a lateral direction of the electric connector and located between the holding target portion of the one arm portion and the holding target portion of the other arm portion.

16. The electric connector according to claim 15, wherein the portion includes one side surface and the other side surface, the one side surface faces the holding target portion of the one arm portion and is in direct contact with the holding target portion of the one arm portion, and the other side surface faces the holding target portion of the other arm portion and is in direct contact with the holding target portion of the other arm portion.

* * * * *